(No Model.)

W. A. NAYLOR.
MACHINE FOR DISINTEGRATING GRASS.

No. 264,739. Patented Sept. 19, 1882.

Witnesses.
Jas. E. Hutchinson.
Robert Everett

Inventor.
Wm. A. Naylor,
By his Attorney,
James L. Norris

UNITED STATES PATENT OFFICE.

WILLIAM A. NAYLOR, OF LAMBERTVILLE, NEW JERSEY.

MACHINE FOR DISINTEGRATING GRASS.

SPECIFICATION forming part of Letters Patent No. 264,739, dated September 19, 1882.

Application filed May 22, 1882. (No model.)

*To all whom it may concern:*

Be it known that I, WILLIAM A. NAYLOR, a citizen of the United States, residing at Lambertville, Hunterdon county, New Jersey, have invented new and useful Improvements in Machines for Disintegrating Grass, of which the following is a specification.

This invention relates to improvements in machines employed for disintegrating or tearing marsh-grasses into shreds or fibers to provide food for cattle; and the objects of the invention are to provide a machine wherein the grass is struck, torn, and carried upward directly as it emerges from feed-rollers, to prevent the entrance of pieces of grass, &c., between the ends of the rotating toothed cylinder and the side walls of the frame, and to provide novel means for sustaining the concave over the toothed cylinder. These objects I accomplish by the construction and arrangement of parts illustrated in the accompanying drawings, in which—

Figure 1:
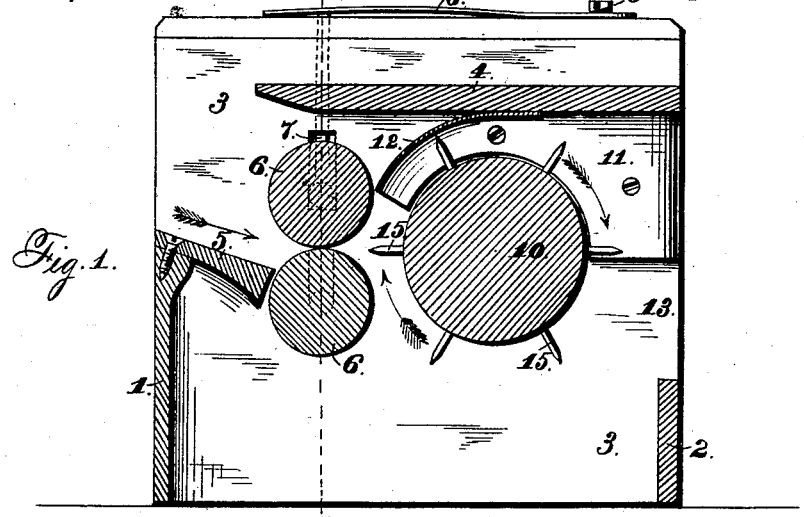
Figure 2:
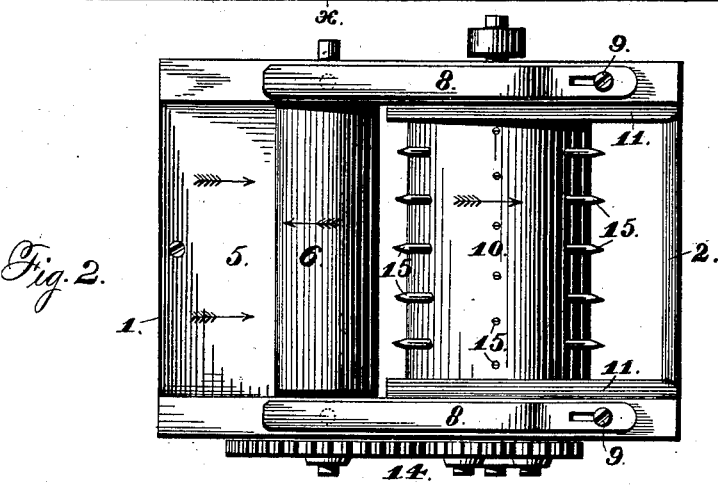
Figure 3:
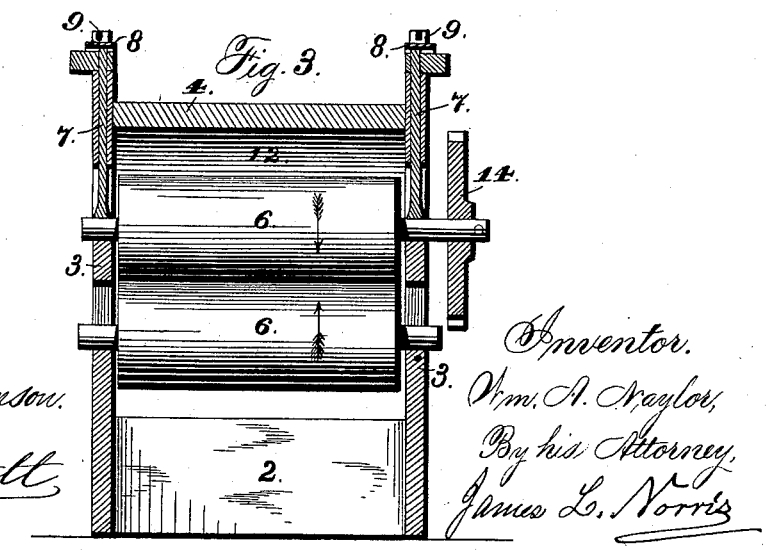

Figure 1 represents a vertical central sectional view of a machine constructed in accordance with my invention; Fig. 2, a top or plan view, the top of the frame and the concave being removed; and Fig. 3, a vertical sectional view on the line $x\ x$ of Fig. 1.

The frame of the machine is composed of a front end wall, 1, a rear cross-bar, 2, vertical side walls, 3 3, and a top wall, 4, all suitably connected together in a substantial manner. To the upper edge of the front wall, 1, is secured a board or shelf, 5, which projects toward the rear end of the machine and inclines downward, and immediately in rear of this shelf are arranged two transverse rollers, 6 6, the journals of the lower roller being arranged in bearings in the side walls, 3, while the journals of the upper roller are arranged in vertical slots in the side walls. On the journals of this upper roller loosely rest the ends of vertical pins or rods 7, located in recesses in the side walls and acted on at their upper ends by the free ends of flat springs 8, which are secured at one end to the top edge of the side walls by adjusting-screw 9, whereby their pressure on the pins or rods can be regulated or adjusted. A toothed cylinder, 10, is journaled at each end in fixed bearings in the side walls, 3, and this cylinder is so arranged that its axis is arranged in a horizontal plane on a line with the contact surfaces of the feed-rollers, and, further, the cylinder is located directly adjacent to the feed-rollers, so that its projecting teeth strike the grass immediately as it emerges from the feed-rollers. The ends of the cylinder are covered by battens 11, having semicircular recesses, so as to partially encircle the ends of the cylinder, and thereby, as it were, break joints between the ends of the cylinder and the inner surface of the side walls, 3, the object of which is to prevent grass from gaining access to the space between the ends of the cylinder and the side walls, which would likely occur by reason of the grass being carried upward and over the cylinder, as hereinafter stated, and which would interfere with the proper working of the machine. The forward ends of the battens 11 are curved, and to such curved ends are secured the ends of a concaved plate, 12, having a plane inner face, the said plate being extended rearwardly under the top wall, 4, and sustained against upward pressure thereby while supported by the battens. The grass to be treated is placed upon the inclined shelf and delivered to the feed-rollers, which act to draw it rearward, and immediately as the grass emerges from the feed-rollers it is struck and caught by the teeth on the cylinder and the concave, and by such action is torn or disintegrated into shreds or fibers, which are finally discharged through the rear open end, 13, of the machine in a divided condition, specially adapted as food for animals. The tearing or disintegrating action of the toothed cylinder commences immediately as the grass emerges from the feed-rollers, and this prepares the grass especially for the subsequent action of the toothed cylinder and concave, thereby subdividing the grass in a very rapid and efficient manner.

By providing the closed side and top walls the shreds are prevented from escaping at any point except through the rear open end of the machine. The battens prevent the shreds from gaining access to the spaces between the ends of the cylinder and the side walls, 3, and by the arrangement of the toothed cylinder adjacent to the feed-rollers I am enabled to bring the machine into a compact space, and at the same time can connect the cylinder and feed-rollers directly together by toothed gear-wheels and pinions 14.

Another advantage gained by commencing the tearing and disintegrating of the grass immediately as it emerges from the feed-rollers is that I can dispense with teeth on the concave, as the grass is prepared especially for the subsequent action of the concave and toothed cylinder.

The upper feed-roller, being acted on by the springs 8, as before explained, provides a vertically-yielding abutment to sustain or support the grass as it is struck by the teeth of the cylinder, and further provides for the free passage of hard substances or an even supply of grass.

The teeth 15 of the cylinder are flat and suitably attached thereto, and are provided with beveled or chisel cutting-edges, and the narrow edges of the teeth are presented to the grass, thereby effectually disintegrating the same.

I am aware that a novel picking-machine has been composed of a frame-work supporting a rotating toothed picker-cylinder, a removable sieve rack or concave beneath the cylinder, a hood over the same, and two rollers for feeding the wool to the picker-cylinder, which latter strikes the wool as it emerges from the feed-rollers; but such is not herein claimed.

I am also aware that two rollers have heretofore been employed to deliver cotton to a cleaning-machine, the upper roller being acted on by spiral springs which permit it to yield vertically; but such is not my invention.

I am further aware that a thrashing-machine has been provided along its side walls with beveled rails which lap over the edges of an endless straw-carrying belt, the ends of such rails being provided with extensions which encircle the upper sides of circular plates secured to the ends of a triangular picker-cylinder which takes the straw from the endless belt and delivers it to a straw-carrier; but such is not herein claimed.

What I claim is—

1. The combination of the frame-work, the feed-rollers, the rotating toothed cylinder arranged to strike, tear, and carry the grass upward as it emerges from the feed-rollers, the battens provided with semicircular recesses which partially encircle the ends of the toothed cylinder, and the immovable concave arranged over the cylinder and having its ends rigidly secured to and supported by the forward ends of the battens, substantially as described.

2. The combination of the frame-work, the feed-rollers, the rotating toothed cylinder, arranged to strike, tear, and carry the grass upward as it emerges from the feed-rollers, the battens provided with curved forward ends and semicircular recesses which partially encircle the ends of the toothed cylinder, the immovable concave arranged above the cylinder and having its ends rigidly secured to the curved forward ends of the battens, and the top wall extending over and supporting the rear portion of the concave against upward pressure and secured to the battens, substantially as described.

In testimony whereof I have hereunto set my hand in the presence of two subscribing witnesses.

WILLIAM A. NAYLOR.

Witnesses:
J. H. BOOZER,
STACY B. BRAY.